(12) United States Patent
Huang et al.

(10) Patent No.: US 8,823,722 B1
(45) Date of Patent: Sep. 2, 2014

(54) SOC WITH INTEGRATED BISTABLE DISPLAY CONTROLLER

(75) Inventors: Samson Huang, Saratoga, CA (US); Alice Hsia, Los Altos, CA (US)

(73) Assignee: Marvell International Ltd., Hamilton (BM)

(*) Notice: Subject to any disclaimer, the term of this patent is extended or adjusted under 35 U.S.C. 154(b) by 388 days.

(21) Appl. No.: 13/209,877

(22) Filed: Aug. 15, 2011

Related U.S. Application Data

(60) Provisional application No. 61/375,537, filed on Aug. 20, 2010, provisional application No. 61/434,247, filed on Jan. 19, 2011.

(51) Int. Cl.
*G06F 13/00* (2006.01)
*G09G 5/397* (2006.01)
*G09G 5/00* (2006.01)

(52) U.S. Cl.
USPC .................................. 345/546; 345/5; 345/538

(58) Field of Classification Search
CPC ............................. G09G 5/006; G09G 3/3611
USPC .................................. 345/1.1, 3.1, 5, 538, 545
See application file for complete search history.

(56) References Cited

U.S. PATENT DOCUMENTS

| | | | | |
|---|---|---|---|---|
| 7,990,338 | B2 * | 8/2011 | Teng et al. | 345/1.3 |
| 2011/0084979 | A1 * | 4/2011 | Rutman et al. | 345/589 |
| 2011/0260948 | A1 * | 10/2011 | Teng et al. | 345/1.1 |

* cited by examiner

*Primary Examiner* — Hau Nguyen

(57) ABSTRACT

Embodiments include a single integrated circuit comprising: a first display controller configured to control a non-bistable display screen; and a second display controller configured to control a bistable display screen. Embodiments also include disposing, on a single integrated circuit, a first display controller capable of controlling a non-bistable display screen; and a second display controller capable of controlling a bistable display screen.

16 Claims, 6 Drawing Sheets

SOC WITH INTEGRATED BISTABLE DISPLAY CONTROLLER

CROSS-REFERENCE TO RELATED APPLICATIONS

This disclosure claims the benefit of U.S. Provisional Patent Application Ser. No. 61/375,537, filed Aug. 20, 2010, and U.S. Provisional Patent Application Ser. No. 61/434,247, filed Jan. 19, 2011. The disclosures of the provisional applications referenced above are incorporated herein by reference.

FIELD

The present disclosure relates generally to the field of displays for mobile devices. More particularly, the present disclosure relates to a system-on-chip (SOC) for controlling such displays.

BACKGROUND

Conventional mobile devices, including mobile phones, smart phones, tablets, and PDAs, typically have a single display screen. Usually this screen is not bi-stable (or non-bistable), meaning the image disappears once the display power is turned off. These non-bistable display screens are often implemented as high-resolution liquid crystal display (LCD) panels. Some eReader devices use bistable display screens. One advantage of the bistable display screen is that the displayed content remains visible after power is removed from the screen.

Given the increasing popularity of such mobile devices, many applications are eliminating the use of paper. For example, smart phones can be used to download and display an airline boarding pass, write a quick note, display an advertisement or coupon, and the like. Mobile devices having a secondary bistable display screen are ideal for such applications. For example, an airline boarding pass can be kept visible in the bistable display screen while the primary display screen is used for other applications, such as making phone calls, web browsing, or the like, or even while the phone is turned off.

FIG. 1 shows a conventional mobile device 100 with a secondary bistable display screen. Referring to FIG. 1, the secondary bistable display screen is implemented as an EPD panel 104. Mobile device 100 also includes an LCD panel 102, a system-on-chip (SOC) 106, a system flash memory 108, a system dynamic random-access memory (DRAM) 110, and other modules 130 such as input/output devices and the like. SOC 106 includes a system processor 140 to control SOC 106 and a memory controller 142 to control memories 108 and 110.

SOC 106 includes an LCD controller 112 to control LCD panel 102. System processor 140 writes display data for LCD panel 102 to an LCD frame buffer 114 in system DRAM 110, and stores control data for LCD panel 102 in an LCD control buffer 116 in system flash memory 108. LCD controller 112 refreshes LCD panel 102 using the display data in LCD frame buffer 114.

EPD panel 104 has been added to mobile device 100 in a conventional manner by adding an external EPD controller 118, which employs a second flash memory 120 and a second DRAM 122. An EPD interface 128, such as an i80 interface, is added to SOC 106 to interface with EPD controller 118. System processor 140 writes display data for EPD panel 104 to system DRAM 110, and then copies that display data, via EPD interface 128, to EPD frame buffer 126 in EPD DRAM 122. EPD controller 118 updates EPD panel 104 using the display data in EPD frame buffer 126. Control data for EPD panel 104 is stored in an EPD control buffer 124 in EPD flash memory 120.

FIG. 2 shows a conventional process 200 for updating EPD panel 104 of mobile device 100 of FIG. 1. Referring to FIG. 2, system processor 140 writes display data to system DRAM 110 at 202, and then copies the display data to EPD DRAM 122 at 204. System processor 140 also writes a display update command to system DRAM 110 at 206, and then copies the display update command to EPD DRAM 122 at 208. EPD controller 118 reads the display data and display update command from EPD DRAM 122 at 210. In response to the command, at 212 EPD controller 118 updates EPD panel 104 using the display data.

SUMMARY

In general, in one aspect, an embodiment features a single integrated circuit comprising: a first display controller configured to control a non-bistable display screen; and a second display controller configured to control a bistable display screen.

In general, in one aspect, an embodiment features disposing, on a single integrated circuit, a first display controller capable of controlling a non-bistable display screen; and a second display controller capable of controlling a bistable display screen.

The details of one or more implementations are set forth in the accompanying drawings and the description below. Other features will be apparent from the description and drawings, and from the claims.

Figure 1:
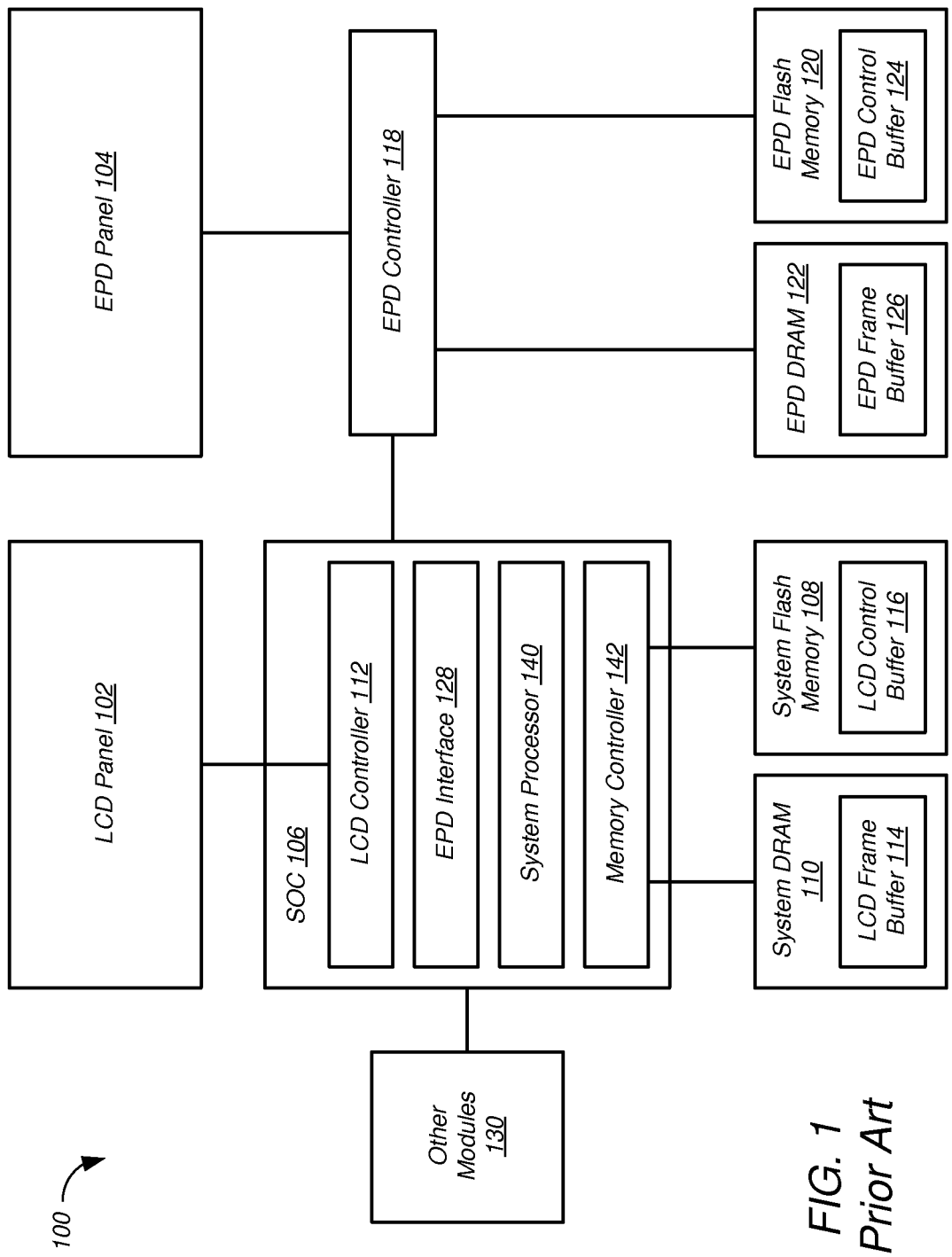
FIG. 1 shows a conventional mobile device with a secondary bistable display screen.

The leading digit(s) of each reference numeral used in this specification indicates the number of the drawing in which the reference numeral first appears.

DETAILED DESCRIPTION

Figure 2:
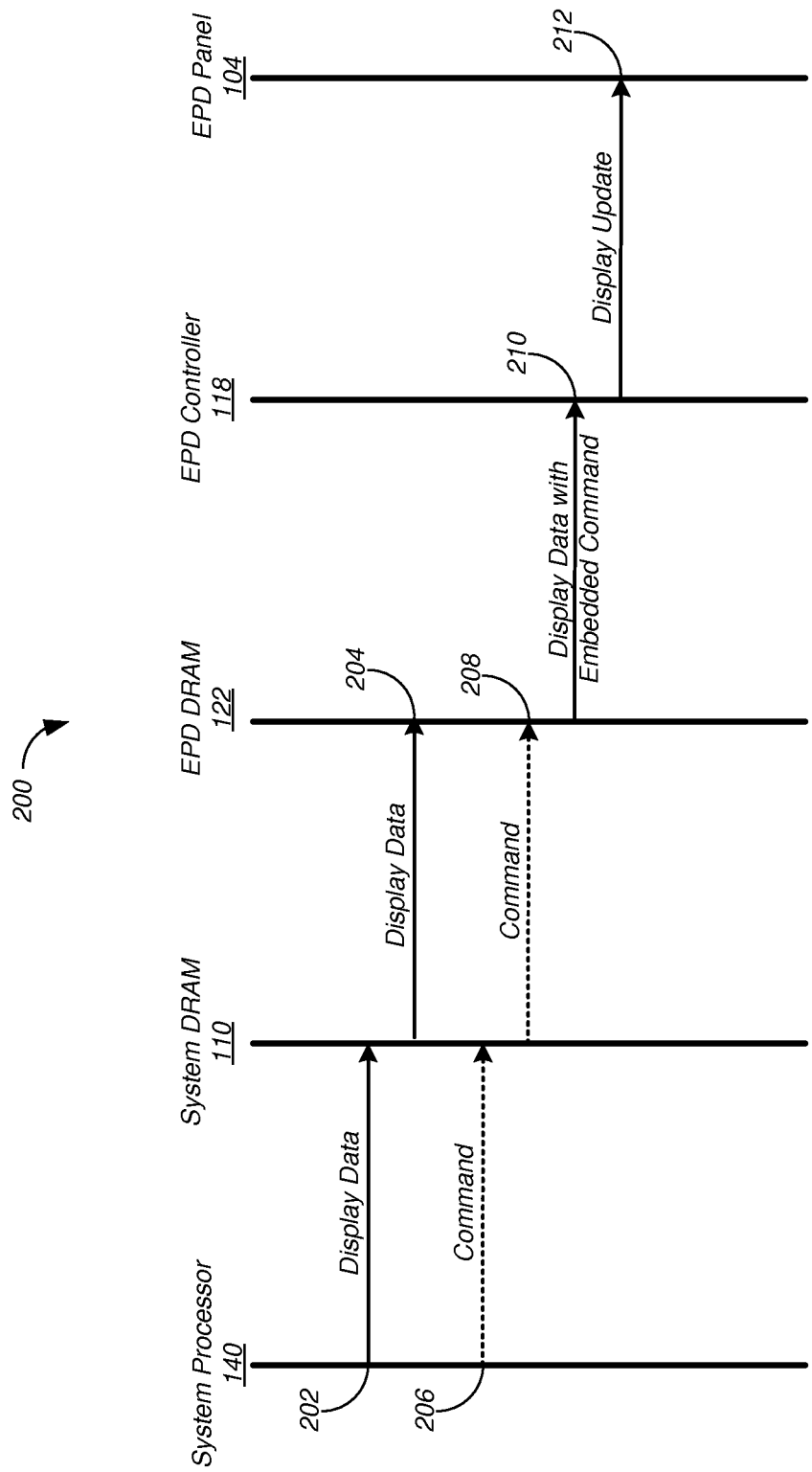
FIG. 2 shows a conventional process for updating the EPD panel of the mobile device of FIG. 1.

Embodiments of the present disclosure provide elements of a single integrated circuit with an integrated bistable display controller. The single integrated circuit can be implemented as a system-on-chip (SOC) Because the bistable display controller is integrated into the SOC, no external bistable display controller is needed. The additional DRAM and flash memories required by the use of an external bistable display controller (FIGS. 1: 122 and 120) are eliminated. The SOC interface for the bistable display controller (FIG. 1: 128) is eliminated. Device count, pin count, area requirements, and power requirements are reduced, with a resulting reduction in cost. Duplicate functions are also eliminated, reducing the time required to display an image in the bistable display. For example, the operation to copy display data from system memory to the bistable display memory (FIG. 2: 206) is eliminated.

Figure 3:
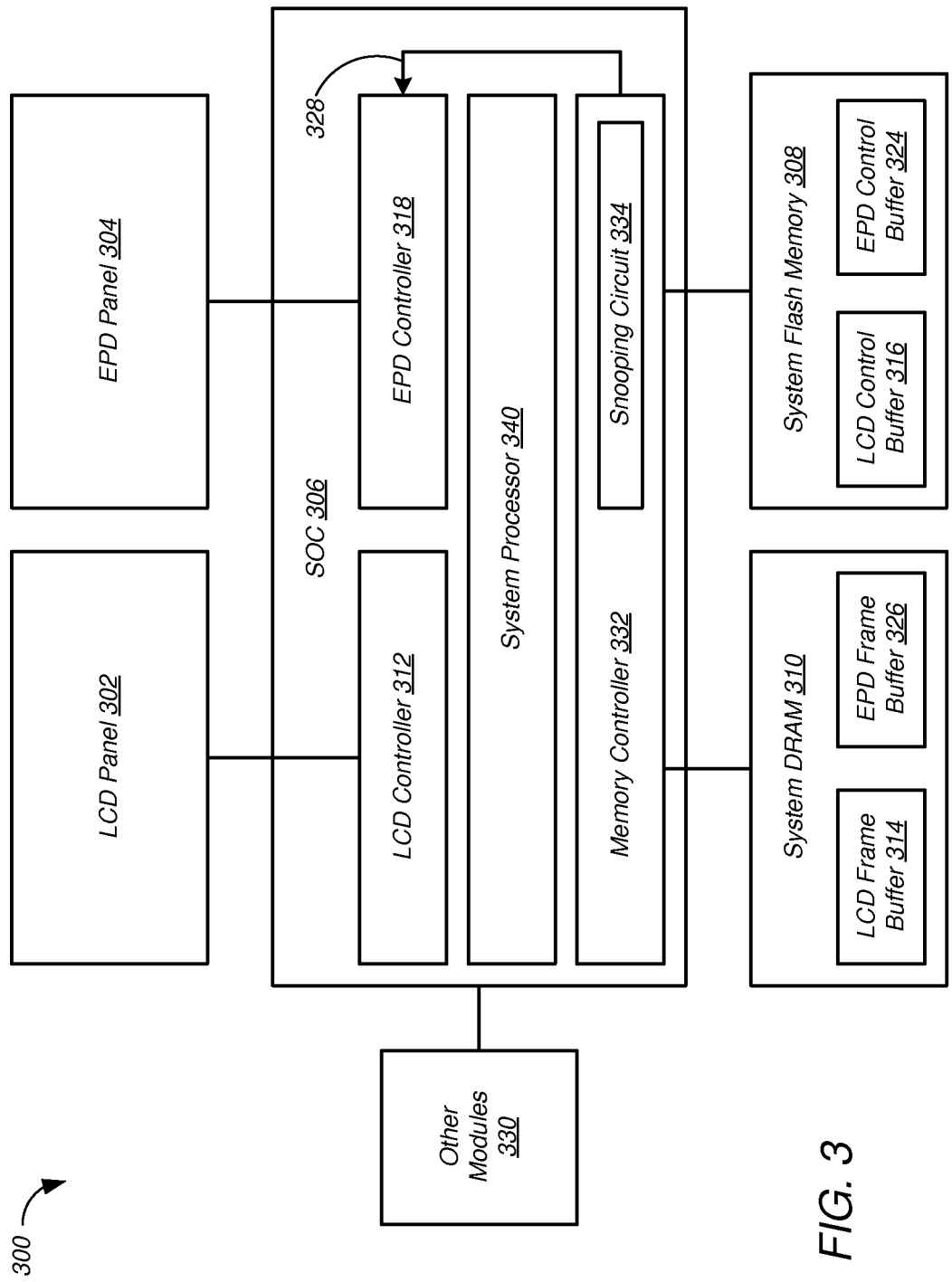
FIG. 3 is a block diagram of a mobile device having an SOC with an integrated bistable display controller according to one embodiment.

FIG. 3 is a block diagram of a mobile device 300 having an SOC with an integrated bistable display controller according to one embodiment. Although in the described embodiments the elements of mobile device 300 are presented in one arrangement, other embodiments may feature other arrangements. For example, elements of mobile device 300 can be implemented in hardware, software, or combinations thereof. Mobile device 300 can be implemented as a mobile phone, smart phone, tablet, personal digital assistant (PDA), and the like.

Referring to FIG. 3, mobile device 300 includes a primary non-bistable display screen and a secondary bistable display screen. In the described embodiments, the non-bistable display screen is implemented as an LCD panel 302, and the bistable display screen is implemented as an EPD panel 304. However, in other embodiments, the display screens can be implemented in other ways. Mobile device 300 also includes a system-on-chip (SOC) 306, a system flash memory 308, a system dynamic random-access memory (DRAM) 310, and other modules 330 such as input/output devices and the like.

SOC 306 includes an LCD controller 312 to control LCD panel 302 and an EPD controller 318 to control EPD panel 304. System processor 340 writes display data for LCD panel 302 to an LCD frame buffer 314 in system DRAM 310, and stores control data for LCD panel 302 in an LCD control buffer 316 in system flash memory 308. System processor 340 writes display data for EPD panel 304 to an EPD frame buffer 326 in system DRAM 310, and stores control data for EPD panel 304 in an EPD control buffer 324 in system flash memory 308. The control data includes panel modulation data, system files, program files, and the like.

Being non-bistable, LCD panel 302 must be constantly refreshed, even when showing a still image. Therefore LCD controller 312 refreshes LCD panel 302 using display data from LCD frame buffer 314 at a constant rate, for example at 60 Hz.

Being bistable, EPD panel 304 is updated only when new display data is available. Memory snooping is used to initiate updates to EPD panel 304. SOC 306 includes a memory controller 332 to control system flash memory 308 and system DRAM 310. Memory controller 332 includes a snooping circuit 334. When new display data is written to EPD frame buffer 326, snooping circuit 334 provides a snooping signal 328 to EPD controller 318. In response to snooping signal 328, EPD controller 318 updates EPD panel 304 by based on the display data in EPD frame buffer 326. EPD controller 318 communicates with system processor 140 using interrupts. For example, EPD controller 318 sends an interrupt to system processor 140 after power up is done, when an image update is done, when a buffer overflows or underflows, and the like.

Figure 4:
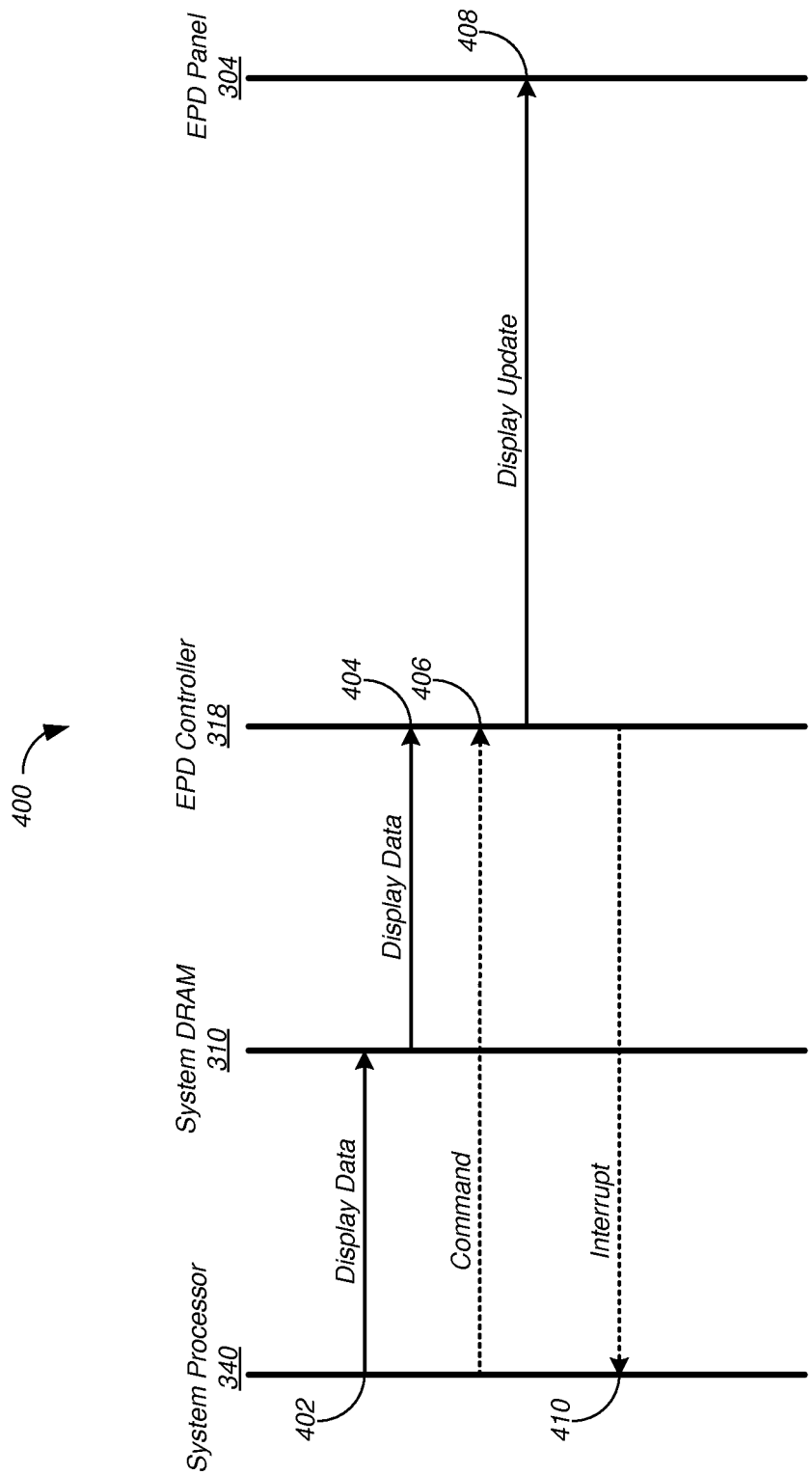
FIG. 4 shows a process for updating the EPD panel of the mobile device of FIG. 3 according to one embodiment.

FIG. 4 shows a process 400 for updating EPD panel 304 of mobile device 300 of FIG. 3 according to one embodiment. Although in the described embodiments the elements of process 400 are presented in one arrangement, other embodiments may feature other arrangements. For example, in various embodiments, some or all of the elements of process 400 can be executed in a different order, concurrently, and the like.

Referring to FIG. 4, system processor 340 writes display data to EPD frame buffer 326 in system DRAM 310 at 402. EPD controller 318 then reads the display data from EPD frame buffer 326 at 404 and updates EPD panel 304 using the display data at 408. EPD controller 318 sends an interrupt to system processor 340 when the EPD panel 304 update is done at 410.

In some display modes, for example such as partial update mode and auto-stopping mode, the display update is triggered by memory snooping. In such modes, when the display data is written to EPD frame buffer 326, snooping circuit 334 provides snooping signal 328 to EPD controller 318. EPD controller 318 then updates EPD panel 304 in response to snooping signal 328 at 408. In other display modes, for example such as full-flash update mode and global update mode, the display update is triggered by a command. In such modes, system processor 340 sends a display update command to EPD controller 318 at 406. EPD controller 318 then updates EPD panel 304 in response to the display update command at 408.

Figure 5:
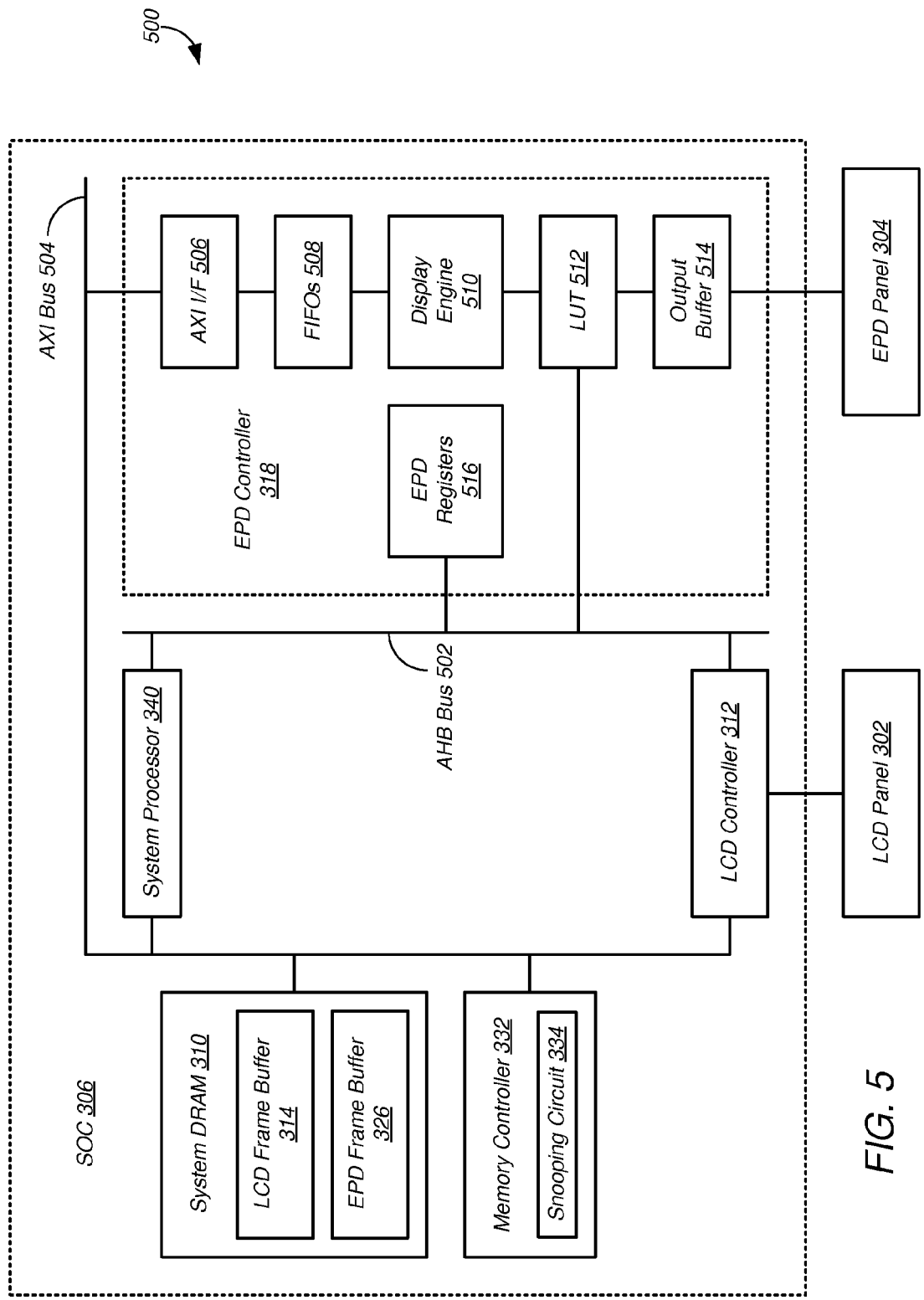
FIG. 5 shows additional detail of the mobile device of FIG. 3 according to one embodiment.

FIG. 5 shows additional detail of mobile device 300 of FIG. 3 according to one embodiment. Referring to FIG. 5, mobile device 300 employs an Advanced Microcontroller Bus Architecture (AMBA), including an AMBA High-performance Bus (AHB) 502 and an Advanced eXtensible Interface (AXI) bus 504.

EPD controller 318 includes an AXI interface (I/F) 506 for AXI bus 504, FIFO buffers 508, a display engine 510, a look-up table (LUT) 512, an output buffer 514, and EPD registers 516. Look-up table 512 contains modulation data for one or more display modes of EPD panel 304, and can be implemented in EPD control buffer 324 in system flash memory 308. EPD registers 516 contain display configuration data for EPD panel 304 such as display modes, display size, display resolutions, clock frequencies, color modes, and the like. EPD registers 516 can be implemented in system DRAM 310.

AXI interface 506 provides an interface between EPD controller 318 and AXI bus 504. FIFO buffers 508 buffer EPD display data as it is delivered from EPD frame buffer 326 to display engine 510. Display engine 510 implements a state machine and control logic to control the flow of EPD display data to EPD panel 304, as well as other aspects including timing, vertical and horizontal synchronization, rendering of the EPD display data, power management for EPD controller 318 and EPD panel 304, and the like. LUT 512 converts the display data to EPD source driver format. Output buffer 514 buffers the formatted display data as it is delivered to EPD panel 304.

Figure 6:
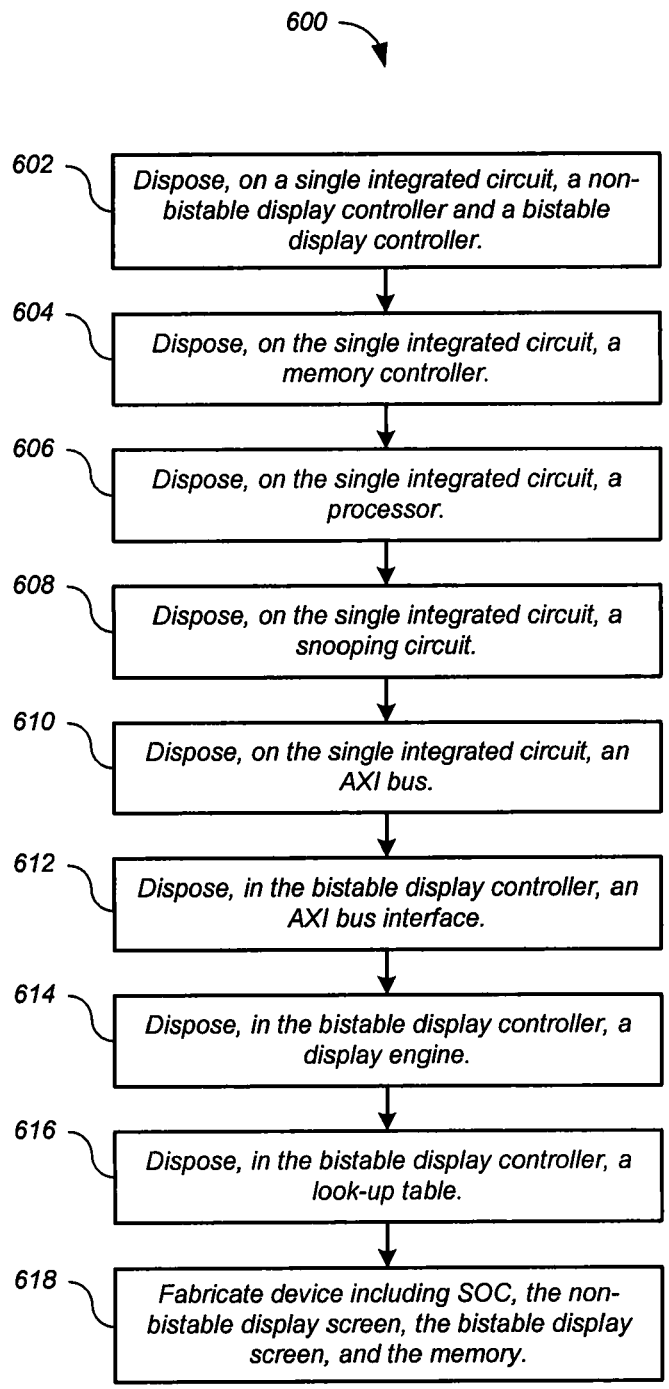
FIG. 6 shows a process for fabricating the mobile device of FIG. 3 according to one embodiment.

FIG. 6 shows a process 600 for fabricating mobile device 300 of FIG. 3 according to one embodiment. Although in the described embodiments, the elements of process 600 are presented in one arrangement, other embodiments may feature other arrangements. For example, in various embodiments, some or all of the steps of process 600 can be executed in a different order, concurrently, and the like. Process 600 is described in terms of fabricating a single integrated circuit. In some embodiments, the single integrated circuit includes SOC 306.

Referring to FIG. 6, at 602, process 600 includes disposing, on the single integrated circuit, non-bistable display controller 312 and bistable display controller 318. Non-bistable display controller 312 is capable of controlling a non-bistable display screen. Bistable display controller 318 is capable of controlling a bistable display screen. In the embodiment of FIG. 3, the non-bistable display screen includes liquid crystal display panel 302, and the bistable display screen includes electrophoretic display panel 304.

Referring again to FIG. 6, at 604, process 600 includes disposing, on the single integrated circuit, memory controller 332. Memory controller 332 is capable of controlling memories 310 and 308. At 606, process 600 includes disposing, on the single integrated circuit, processor 340. Processor 340 is capable of writing first display data to frame buffer 314 in memory 310, and writing second display data to frame buffer 326 in memory 310. Non-bistable display controller 312 is capable of updating the non-bistable display screen according to contents of frame buffer 314. Bistable display controller 318 is capable of updating the bistable display screen according to contents of frame buffer 326.

At 608, process 600 includes disposing, on the single integrated circuit, snooping circuit 334. Snooping circuit 334 is capable of providing snooping signal 328 when the second display data is written to frame buffer 326. Bistable display controller 318 is capable of updating the bistable display screen responsive to snooping signal 328.

At 610, process 600 includes disposing, on the single integrated circuit, Advanced eXtensible Interface (AXI) bus 504. AXI bus 504 is capable of transferring the second display data from frame buffer 326 to bistable display controller 318. At 612, process 600 includes disposing, in bistable display controller 318, AXI bus interface 506. AXI bus interface 506 is capable of communicating with AXI bus 504.

At 614, process 600 includes disposing, in bistable display controller 318, display engine 510. Display engine 510 is capable of controlling flow of the second display data. At 616, process 600 includes disposing, in bistable display controller 318, look-up table 512. Look-up table 512 is capable of converting the second display data to source driver format for the bistable display screen.

At 618, process 600 includes fabricating device 300. Device 300 includes SOC 306, the non-bistable display screen, the bistable display screen, and memory 310. Device 300 can be implemented as a mobile phone, a smart phone, a tablet, a personal digital assistant (PDA), and the like.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A single integrated circuit, comprising:
   a first display controller configured to control a non-bistable display screen, wherein images disappear from the non-bistable display screen when power to the non-bistable display screen is turned off;
   a second display controller configured to control a bistable display screen, wherein images do not disappear from the bistable display screen when power to the bistable display screen is turned off;
   a memory controller configured to control a memory;
   a processor configured to write first display data to a first frame buffer in the memory, and to write second display data to a second frame buffer in the memory, wherein the first display controller is further configured to update the non-bistable display screen according to contents of the first frame buffer, and wherein the second display controller is further configured to update the bistable display screen according to contents of the second frame buffer; and
   a snooping circuit configured to (i) determine when the second display data is written to the second frame buffer, and (ii) provide a snooping signal in response to the second display data being written to the second frame buffer,
   wherein the second display controller is further configured to update the bistable display screen in response to the snooping signal indicating that the second display data was written to the second frame buffer.

2. The single integrated circuit of claim 1, wherein:
   the non-bistable display screen includes a liquid crystal display panel; and
   the bistable display screen includes an electrophoretic display panel.

3. A system-on-chip (SOC) comprising the single integrated circuit of claim 1.

4. A device comprising:
   the SOC of claim 3;
   the non-bistable display screen;
   the bistable display screen; and
   the memory.

5. The device of claim 4, wherein the device is selected from the group consisting of:
   a mobile phone;
   a smart phone;
   a tablet; and
   a personal digital assistant (PDA).

6. The SOC of claim 3, wherein the second display controller comprises:
   a display engine configured to control flow of the second display data.

7. The SOC of claim 3, wherein the second display controller comprises:
   a look-up table configured to convert the second display data to source driver format for the bistable display screen.

8. The SOC of claim 5, further comprising:
   an Advanced eXtensible Interface (AXI) bus configured to transfer the second display data from the second frame buffer to the second display controller, wherein the second display controller includes an AXI bus interface configured to communicate with the AXI bus.

9. A method comprising:

on a single integrated circuit,
- using a first display controller, controlling a non-bistable display screen,
- using a second display controller, controlling a bistable display screen, wherein images disappear from the non-bistable display screen when power to the non-bistable display screen is turned off, and images do not disappear from the bistable display screen when power to the bistable display screen is turned off,
- using a memory controller, controlling a memory,
- using a processor, i) writing first display data to a first frame buffer in the memory, and ii) writing second display data to a second frame buffer in the memory,
- using the first display controller, updating the non-bistable display screen according to contents of the first frame buffer,
- using the second display controller, updating the bistable display screen according to contents of the second frame buffer,
- using a snooping circuit, (i) determining when the second display data is written to the second frame buffer, and (ii) providing a snooping signal in response to the second display data being written to the second frame buffer, and
- using the second display controller, updating the bistable display screen in response to the snooping signal indicating that the second display data was written to the second frame buffer.

10. The method of claim 9, wherein:

the non-bistable display screen includes a liquid crystal display panel; and the bistable display screen includes an electrophoretic display panel.

11. The method of claim 9, wherein:

the single integrated circuit includes a system-on-chip (SOC).

12. The method of claim 11, further comprising:

fabricating a device, wherein the device comprises
- the SOC,
- the non-bistable display screen,
- the bistable display screen, and
- the memory.

13. The method of claim 12, wherein the device is selected from the group consisting of:
- a mobile phone;
- a smart phone;
- a tablet; and
- a personal digital assistant (PDA).

14. The method of claim 11, further comprising:

disposing, on the single integrated circuit, an Advanced eXtensible Interface (AXI) bus capable of transferring the second display data from the second frame buffer to the second display controller; and disposing, in the second display controller, an AXI bus interface capable of communicating with the AXI bus.

15. The method of claim 11, further comprising:

disposing, in the second display controller, a display engine capable of controlling flow of the second display data.

16. The method of claim 11, further comprising:

disposing, in the second display controller, a look-up table capable of converting the second display data to source driver format for the bistable display screen.

* * * * *